US008626228B1

(12) United States Patent
Pulugurta

(10) Patent No.: US 8,626,228 B1
(45) Date of Patent: Jan. 7, 2014

(54) ACCESS-PROVISIONING NODE IN A RADIO ACCESS NETWORK

(75) Inventor: Srikanth Pulugurta, Woodstock, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 360 days.

(21) Appl. No.: 13/021,917

(22) Filed: Feb. 7, 2011

(51) Int. Cl.
 *H04W 52/04* (2009.01)
(52) U.S. Cl.
 USPC ......... 455/522; 455/69; 455/420; 455/412.2; 455/41.2
(58) Field of Classification Search
 USPC ............ 455/69, 522, 13.4, 41.2, 41.1, 115.1, 455/135, 458, 509, 552.1, 220, 226.3, 410, 455/422.1, 501, 435.1, 414.3, 452.1; 717/157; 370/241, 329, 330, 336, 338, 370/349, 474, 229, 278
 See application file for complete search history.

(56) References Cited

U.S. PATENT DOCUMENTS

| 7,002,942 | B2* | 2/2006 | Kotzin | 370/338 |
|---|---|---|---|---|
| 2005/0143123 | A1* | 6/2005 | Black et al. | 455/552.1 |
| 2008/0318547 | A1* | 12/2008 | Ballou et al. | 455/410 |
| 2009/0006796 | A1* | 1/2009 | Chang et al. | 711/163 |
| 2010/0031242 | A1* | 2/2010 | Hong et al. | 717/157 |
| 2010/0120426 | A1* | 5/2010 | Singh et al. | 455/435.1 |
| 2010/0265827 | A1* | 10/2010 | Horn et al. | 370/241 |
| 2010/0325515 | A1* | 12/2010 | Lohmar et al. | 714/752 |
| 2011/0098054 | A1* | 4/2011 | Gorokhov et al. | 455/452.1 |
| 2011/0182174 | A1* | 7/2011 | Pi et al. | 370/229 |
| 2011/0199985 | A1* | 8/2011 | Cai et al. | 370/329 |
| 2011/0250911 | A1* | 10/2011 | Xu et al. | 455/501 |
| 2011/0252237 | A1* | 10/2011 | PalChaudhuri et al. | 713/168 |
| 2012/0108199 | A1* | 5/2012 | Wang et al. | 455/405 |
| 2012/0275427 | A1* | 11/2012 | Kalhan | 370/330 |

\* cited by examiner

*Primary Examiner* — Tan Trinh

(57) ABSTRACT

Disclosed herein are methods and systems for an access-provisioning node, which may help mobile stations utilize network resources more efficiently when accessing a radio access network. An exemplary method involves: (a) at an access-provisioning node installed in a coverage area of a radio access network, determining a verified transmit power for reverse-link communications from the system-information node to a base station in the radio access network, wherein the reverse link communications are carried out under a first wireless protocol; and (b) the access-provisioning node transmitting a transmit-power message under a second wireless protocol, wherein the second wireless protocol is a short-range wireless protocol, and wherein the transmit-power message comprises an indication of the verified transmit power for use by a mobile station to set an initial transmit power of the mobile station.

22 Claims, 4 Drawing Sheets

ACCESS-PROVISIONING NODE IN A RADIO ACCESS NETWORK

BACKGROUND

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1 xRTT networks" (or "1x networks" for short), which stands for "Single Carrier Radio Transmission Technology." Another CDMA protocol that may be used is known as Evolution Data Optimized (EV-DO), perhaps in conformance with one or more industry specifications such as IS-856, Rel. 0 and IS-856, Rev. A. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. These base stations are typically not associated with any subscriber or small group of subscribers in particular; rather, they are placed in publicly-accessible locations and are used by the service provider's customers generally, and their coverage areas collectively blanket cities, rural areas, etc. When a mobile station is positioned in one of these coverage areas, it can communicate over the air interface with the base station, and in turn over one or more circuit-switched and/or packet-switched signaling and/or transport networks to which the base station provides access. In such an arrangement, the base-station-to-mobile-station link is known as the forward link, while the mobile-station-to-base-station link is known as the reverse link.

When a mobile station seeks to, as examples, originate a communication session (e.g. a voice call) or respond to a page message from a base station, the mobile station sends one or more messages known as access probes to the base station over a reverse-link access channel. As part of this process, the mobile station determines a transmit power level at which to send communications to the base station.

OVERVIEW

To arrive at an appropriate transmit power for communications, a mobile station typically determines an initial power level at which to send an initial access probe, and then transmits the access probe. If the base station does not acknowledge the initial access probe, the mobile station then re-transmits the access probe at an incrementally higher power level (e.g., 3 dB higher than the previous access probe). The mobile station repeats this process (i.e., incrementally increasing the power level and re-transmitting) until either receiving an acknowledgement from the base station or reaching a set number (e.g., five) of transmitted access probes. The mobile station may then wait a timeout period, and start again at the initial power level. The mobile station may repeat this entire cycle a set number of times (e.g., three) before concluding that the base station is not reachable, or perhaps waiting a longer timeout period before starting the entire sequence over. (It should be noted that variations on this access-probe-sending sequence exist as well, as this description is merely an example.)

Herein, the initial power level used for the initial attempt to send an access probe is referred to herein as the "initial transmit power." Furthermore, the power level that is ultimately determined to be appropriate for reverse-link communications (e.g., the transmit power used to send the access probe when an acknowledgement approving the transmit power is received from the base station), is referred to herein as the "verified transmit power."

There are drawbacks to existing techniques for determining initial transmit power. For instance, while access probes are transmitted over the reverse link access channel, the initial transmit power is typically calculated based on forward link parameters, relying on the assumption that conditions on the forward link and the reverse link are similar. In practice, however, reverse link conditions may differ from those on the forward link, and resulting inaccuracies may lead to inefficient use of reverse-link resources. For example, some mobile stations may transmit access probes with more power than is required to reach the base station.

However, due at least in part to an inaccurately-determined initial transmit power values, mobile stations often end up engaging in several rounds of back-and-forth messaging with their serving base stations. This back-and-forth messaging may involve repeated attempts to transmit an access probe, which in turn increases congestion on the reverse-link. The effect of repeated transmissions may be amplified the more inaccurate the initial transmit power is (e.g., the greater the difference between the initial transmit power and the verified transmit), as more attempts may be required before the verified transmit power is determined. This may be particularly problematic in scenarios where a large number of users attempt to connect at substantially the same time, and thus are all concurrently engaging in back-and-forth messaging with a given base station in order to respectively determine the appropriate verified transmit power for reverse-link communications.

Accordingly, exemplary methods and systems are described herein that may help to provide mobile stations with an indication of the initial transmit power that should be used, which may be more accurate, on average, than the initial transmit power that would have been used with existing techniques. In particular, a special purpose entity may be installed by a service provider to determine the verified transmit power for reverse-link communications at a given location, and to provide an indication of its verified transmit power to nearby mobile stations. Such a special-purpose device may be referred to herein as an "access provisioning node."

An exemplary access-provisioning node uses a short-range wireless protocol, such as Bluetooth or 802.11, to broadcast an indication of its verified transmit power. As such, this indication is generally provided only to those mobile stations that are located within a short distance from the device (e.g., within 30 feet (Bluetooth) or 100 feet (WiFi)). It may therefore be assumed that the air-interface conditions being experienced by a mobile station that receives the verified transmit power are similar to those being experienced at the access-provisioning node. Thus, using the verified transmit power determined by the access-provisioning node as its initial transmit power may help a mobile station that is located near the access-provisioning node reduce the back-and-forth messaging during open-loop power control.

In one aspect, an exemplary method for an access-provisioning node involves: (a) at an access-provisioning node installed in a coverage area of a radio access network, determining a verified transmit power for reverse-link communications from the system-information node to a base station in the radio access network, wherein the reverse link communications are carried out under a first wireless protocol; and (b) the access-provisioning node transmitting a transmit-power message under a second wireless protocol, wherein the second wireless protocol is a short-range wireless protocol, and wherein the transmit-power message comprises an indication of the verified transmit power for use by a mobile station to set an initial transmit power of the mobile station.

In a further aspect, an exemplary method for a mobile station involves: (a) before a mobile station transmits an access probe, the mobile station performing a search for a transmit-power message that is broadcast from an access-provisioning node under a second wireless protocol, wherein the second wireless protocol is a short-range wireless protocol, and wherein the transmit-power message comprises an indication of a verified transmit power for reverse-link communications under a first wireless protocol, wherein the verified transmit power has been determined by the access-provisioning node for reverse-link communications from the system-information node to a base station in the radio access network; (b) if the transmit-power message is acquired in the search, then the mobile station using the indication of the verified reverse-link transmit power as a basis for determining an initial transmit power for the access probe; (c) if the transmit-power message is not acquired in the search, then the mobile station using a default process to determine the initial transmit power for the access probe; and (d) transmitting the access probe to the base station at the determined initial transmit power.

In yet another aspect, an exemplary access-provisioning system may include: (a) a first communication interface configured for wireless communications with a base station in a radio access network, wherein communications with the base station are carried out under a first wireless protocol; (b) a second communication interface configured for wireless communications with a mobile station, wherein communications with the base station are carried out under a second wireless protocol, wherein the second wireless protocol is a short-range wireless protocol; and (c) program instructions stored in a non-transitory computer readable medium and executable by at least one processor to cause the access-provisioning system to: (i) determine a verified transmit power for reverse-link communications from the system-information node to a base station in the radio access network, wherein the reverse link communications are carried out under a first wireless protocol; and (ii) transmit a transmit-power message under the second wireless protocol, wherein the transmit-power message comprises an indication of the verified transmit power for use by a mobile station to set an initial transmit power of the mobile station.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

According to an exemplary embodiment, a service provider may install a network component that uses a short-range wireless protocol to provide nearby mobile stations with system information, in order to help the mobile stations to more efficiently connect to a radio access network (RAN). This component may be referred to herein as an "access-provisioning node." Since the access-provisioning node uses a short-range wireless protocol, such as Bluetooth or 802.11, it only provides system information to those mobile stations that are located within a short distance from the device (e.g., 30 feet (Bluetooth) or 100 feet (WiFi)). As such, it may be assumed that the air-interface conditions being experienced by a mobile station that receives system information from the access-provisioning node are similar to those being experienced at the access-provisioning node.

The system information provided by an access-provisioning node preferably includes an indication of the transmit power that the access-provisioning node has determined to be appropriate for reverse link communications sent from its location (i.e., the verified transmit power of the access-provisioning node). By using the access-provisioning node's verified transmit power as its own initial transmit power, a mobile station that receives a broadcast from the access-provisioning node (and thus can be assumed to be located near the access-provisioning node) may reduce the amount of back-and-forth messaging involved in connecting to a RAN.

Figure 1:
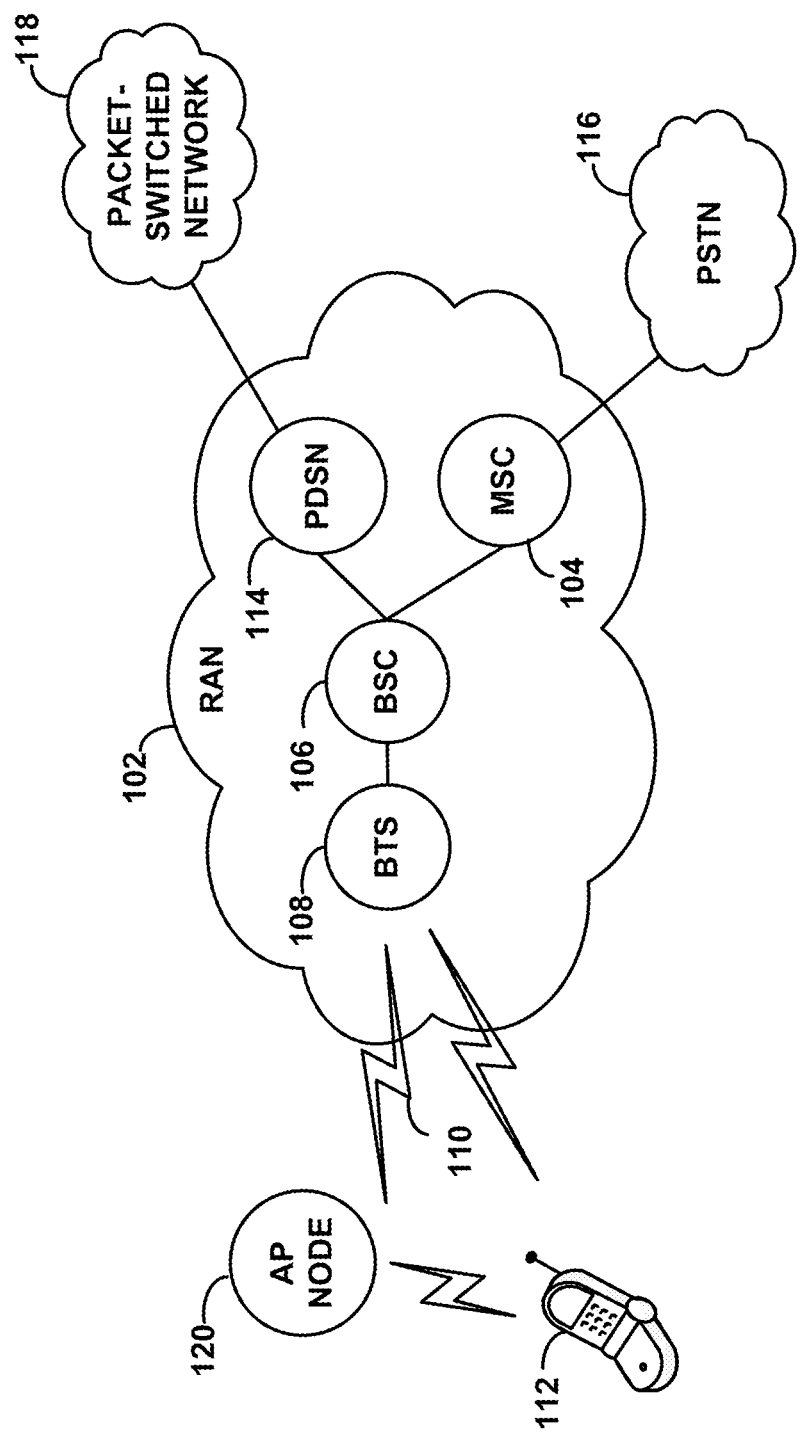
FIG. 1 is a simplified block diagram of a wireless communication system in which an exemplary method and system may be implemented.

Referring to the drawings, FIG. 1 is a simplified block diagram of a wireless communication system in which an exemplary method and system may be implemented. In such a wireless communication system, a wireless carrier typically operates a radio access network (RAN) 102, which is controlled by a switching entity such as a mobile switching center (MSC) 104. The MSC generally includes or connects with one or more base station controllers (BSCs) 106, which in turn connect with one or more base transceiver stations (BTSs) 108. Each BTS 108 conventionally includes a cell tower with one or more antennas that communicate with mobile stations 112, 113, 115 via air interfaces 110.

Communications between the RAN 102 and mobile stations 112, 113, 115 may occur in accordance with any air interface protocol now known or later developed. Examples of such protocols include CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, and infrared. Other protocols may also be employed.

With the illustrated configuration, RAN 102 may provide service in an area that is divided geographically into a number of cells, each defined by a radio frequency (RF) radiation pattern from a BTS 108. Furthermore, each cell may be subdivided into a number of sectors. For simplicity, references to a "sector" herein should be understood to include sectors, cells, and possibly other types of coverage areas as well. In general, air interface communications in each sector (or other such coverage area) of a cellular wireless communication system can be encoded or carried in a manner that distinguishes the communications in that sector from communications in adjacent sectors. For example, in a Code Division Multiple Access (CDMA) system, each sector has a respective pseudo-random noise offset or "PN offset" that is used to encode or modulate air interface communications in the sector distinctly from those in adjacent sectors. Analogously, in other air interface protocols, communications in one sector may be distinguished from those in other sectors by frequency, time, and/or various other parameters.

BTS 108 may be any network element arranged to carry out the BTS functions described herein. As such, BTS 108 may include a communication interface, a processor, and data storage comprising instructions executable by the processor to carry out those BTS functions. The communication interface may include one or more antennas, chipsets, and/or other components for providing one or more CDMA coverage areas such as cells and sectors, for communicating with mobile stations such as mobile station 112 over an air interface. The communication interface may also include one or more wired (e.g. Ethernet) and/or wireless (e.g. WiFi or WiMax) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired (e.g. Ethernet) and/or wireless (e.g. WiFi or WiMax) interfaces for communicating with at least BTS 108, and mobile switching center (MSC) 104. In general, BSC 106 functions to control one or more BTSs such as BTS 104, and to provide those one or more BTSs with connections to switches such as MSC 104 or a packet data serving node (PDSN) 114, for instance.

Note that the combination of BTS 108 and BSC 106 may be considered a base station. However, BTS 108 or BSC 106 could, taken alone, each be considered a base station as well. Furthermore, a base station may be considered to be either or both of those devices, and perhaps make use of one or more functions provided by MSC 104, and/or other network entities.

MSC 104 and PDSN 114 may be any networking elements arranged to carry out the switch functions described herein. Thus, MSC 104 and/or PDSN 114 may include a communication interface, a processor, and data storage comprising instructions executable by the processor to carry out those switch functions. MSC 104 preferably functions to provide connectivity to a public-switched telephone network (PSTN) 116, while PDSN 114 preferably functions to provide connectivity to one or more packet-switched networks 118, such as the Internet. Accordingly, the communication interface of PDSN 114 may include one or more wired (e.g. Ethernet) and/or wireless (e.g. WiFi or WiMax) interfaces for communicating with at least BSC 106 and other entities via packet-switched network 118. Further, it should be understood that while MSC 104 and PDSN 114 are shown as separate entities, some or all of the functionality of these entities may be combined in a single switching entity.

Mobile station 112 may be any type of mobile device arranged to carry out the mobile-station functions described herein. As examples, mobile station 112 could be a cell phone, a PDA, a computer, a laptop computer, a hybrid CDMA/EV-DO device, and/or a multi-mode cellular/Wi-Fi device. As such, a mobile station may include a user interface, a wireless-communication interface, a processor, and data storage comprising instructions executable by the processor for carrying out those mobile-station functions. The user interface may include buttons, a touchscreen, a microphone, and/or any other elements for receiving inputs, as well as a speaker, one or more displays, and/or any other elements for communicating outputs. Further, while the term "mobile station" is a term of art commonly used for such devices, the term "mobile station" should be understood to include non-mobile devices, such as a personal computer or any other device capable of the functionality of a mobile station described herein.

In another aspect, RAN 102 and mobile station 112 may be configured for Over-The-Air Service Provisioning (OTASP). OTASP allows service providers to communicate with a mobile station using a wireless network, such as the Internet, in order to add new types of services to the mobile station, rather than requiring that the customer to bring the mobile station to a service provider location (e.g., a storefront or service center) for reprogramming. Accordingly, mobile station 112 may be configured with the functionality described herein using OTASP. Configured as such, OTASP may be used to update a mobile station to provide at least some of the functionality described herein.

An exemplary mobile station 112 may be configured to adjust the transmit power at which it communicates with RAN 102. Under IS-2000, for example, a mobile station 112 typically engages in two types of power control for reverse-link communications: open-loop power control and closed-loop power control. A mobile station 112 typically applies open-loop power control just before the mobile station attempts to connect to the RAN 102. As such, open-loop power control is generally based on (a) the strength of forward-links signals as measured by the mobile station and/or (b) predetermined settings provided to a mobile station by the RAN. Closed-loop power control, on the other hand, is typically applied once a mobile station has connected to the RAN, and thus may rely on the RAN's signal-strength measurements for reverse-link communications, which are then provided to the mobile station by the RAN.

Under IS-2000, the open-loop power-control process involves a mobile station determining an initial transmit power in decibels (dB), and then sending an access probe at the determined initial transmit power. Then, if no acknowledgement is received, mobile station 200 may increase its transmit power and retransmit the access probe until either an acknowledgment is received, or the attempt to connect is deemed to have failed (e.g., after a certain number of attempts without acknowledgement or after a predetermined timeout period has elapsed without acknowledgement). When an acknowledgement is received, the mobile station may sets its transmit power for reverse-link transmissions equal to the transmit power used for the most-recent access-probe attempt. The mobile station may then update its reverse-link transmit power as needed, using feedback from the RAN that is provided according to closed-loop power control.

In practice, a mobile station operating under IS-2000 may determine the initial transmit power (ITP) at which the mobile station transmits the initial access probe during the open-loop power control as follows:

$$\text{ITP}=-(\text{RSSI})-76+(\text{Nom\_Pwr})+\text{Probe\_Adj\_Pwr}+E_c/I_o\_\text{Correction}$$

In the above calculation, the Received Signal Strength Indicator (RSSI) is typically an indication of received signal strength at the mobile station, as measured by the mobile station. A mobile station may determine RSSI using techniques that are well known to those skilled in the art. The Nominal Power (Nom_Pwr) is typically a network setting that is determined by the BSC or another network entity and relayed to a mobile station in a page message that is transmitted when the mobile station powers on. In practice, Nom_Pwr typically is set to a constant value ranging from zero and three. The Probe Adjust Power (Probe_Pwr_Adj) parameter is typically a constant that is predefined by the service provider, and is also provided to a mobile station by the access network. Further, the $E_c/I_o$ Correction parameter helps correct for interference, and may be based on the interference experienced on the forward link ($E_c/I_o$). For example, $E_c/I_o$ Correction may be calculated as equal to: min(max(−7−$E_c/I_o$, 0), 7)).

As shown in FIG. 1, a service provider has installed an access-provisioning node 120 in RAN 102. This access-provisioning node 120 is preferably configured to determine and provide nearby mobile stations with an indication of the appropriate transmit power for each mobile station's initial access-probe attempt (and possibly other parameters to assist the mobile station in connecting to the RAN as well). Preferably, this indication is the transmit power that the access-provisioning node 120 has currently determined is appropriate for its own reverse-link communications.

A service provider may install access-provisioning node 120 in an effort to reduce the amount of resources consumed when the MSs near to the access-provisioning node attempt to connect to the RAN. More specifically, the access-provisioning node may engage in power control processes to determine the appropriate transmit power for reverse-link communications, which is likely to be closer to the appropriate transmit power for nearby mobile stations than an initial transmit power that the mobile station calculates based on forward-link parameters (which is typically low). Therefore, by providing nearby mobile stations with an indication of the actual transmit power that the access-provisioning node has determined to be appropriate for reverse-link communications from the access-provisioning node to a given base station, the amount of network resources consumed by a mobile station while connecting to the base station may be reduced, since less attempts may be required for the mobile station to successfully connect.

In an exemplary embodiment, access-provisioning node 120 broadcasts the transmit-power messages using a short-range wireless protocol that operates on an unlicensed frequency band, such as 802.11 or Bluetooth. Advantageously, the use of a short-range wireless protocol operating on an unlicensed frequency band means that the transmit-power message is only available within a small area surrounding the access-provisioning node. It may therefore be assumed that any mobile station that receives the transmit-power message is located in close proximity to the access-provisioning node (i.e., within the broadcast range of the short-range wireless protocol), and that as a result, the mobile station is likely experiencing similar reverse-link conditions as the access-provisioning node. This in turn means that the reverse-link transmit power that would ultimately be determined by the mobile station using traditional techniques is likely be similar to the reverse-link transmit power that is determined by the access-provisioning node.

In a further aspect, access-provisioning node 120 is preferably configured to determine and adjust its own transmit power using the same or similar power control processes as typically are used by mobile stations operating in an IS-2000 network. For example, the access-provisioning node 120 may be configured to determine the initial transmit power for an access probe in a similar manner IS-2000 mobile stations typically would (i.e., using a calculation based on forward-link parameters), and to engage in open-loop power control to determine an appropriate transmit power at which to initiate reverse-link communications. Further, in order to account for changing air-interface conditions, the access-provisioning node 120 may adjust its transmit power by engaging in closed-loop power control with its serving base station.

In a further aspect, the verified transmit power of the access-provisioning node 120 may change as air-interface conditions between the access-provisioning node 120 and the BTS 108 change over time. For example, the verified transmit power may initially be determined using open-loop power control. For instance, the access-provisioning node 120 may initially set the verified equal to the transmit power used to send the access probe to which the base station responded with an acknowledgement confirming the transmit power level. However, the access-provisioning node may subsequently use closed-loop power control to adjust the verified transmit power as air-interface conditions change and/or feedback is received from the base station.

In particular, since the verified transmit power may change over time, access-provisioning node 120 is preferably configured to continually or periodically broadcast transmit power messages, so that nearby mobile stations have up-to-date transmit power information. For example, access-provisioning node 120 may be configured to initially send a transmit power message after performing open loop control, and then to periodically send a transmit-power messages reflecting adjustments to the VTP resulting from closed loop power control.

Figure 2:
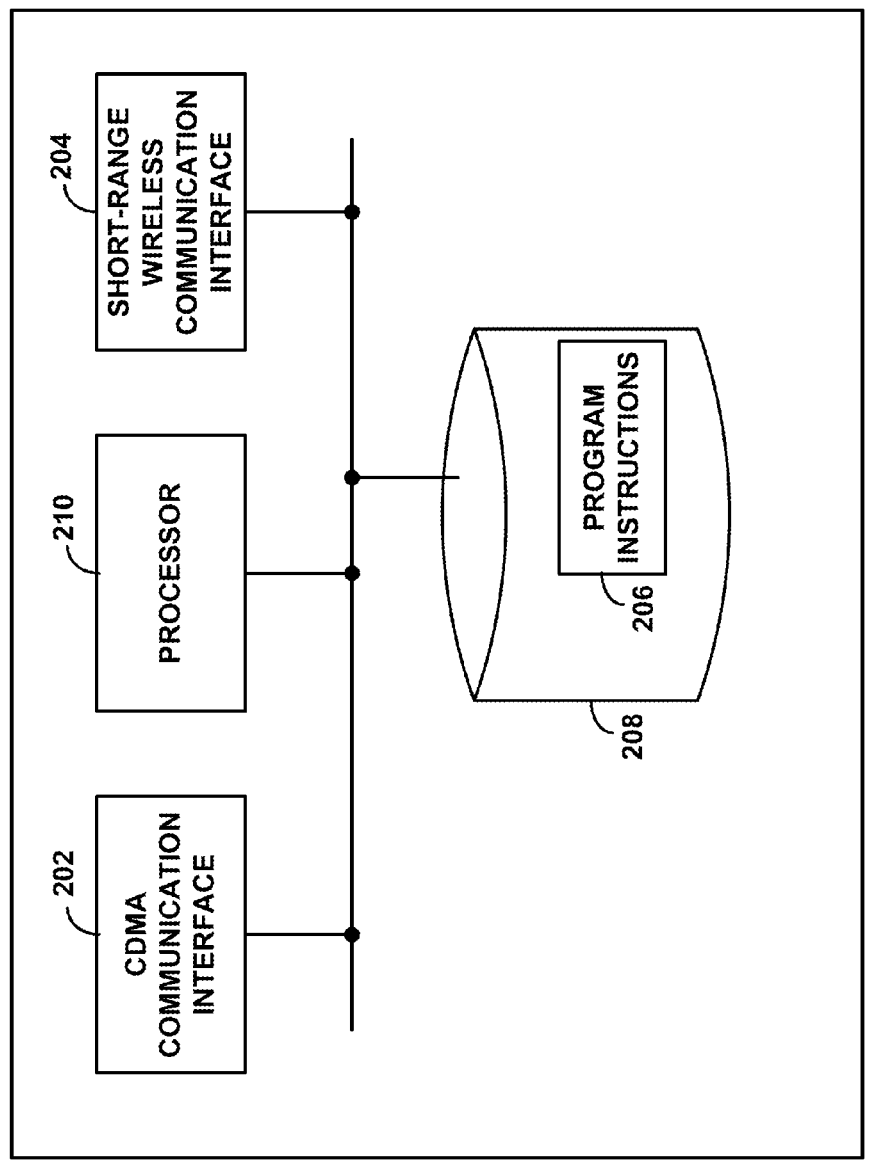
FIG. 2 is a simplified block diagram illustrating an access-provisioning system according to an exemplary embodiment.

FIG. 2 is a simplified block diagram illustrating an access-provisioning system 200 according to an exemplary embodiment. An exemplary system may take the form of an access-provisioning node itself, such as access-provisioning node 120, or may be a component of an access-provisioning node. The access-provisioning node 200 is preferably equipped with two communication interfaces to facilitate both (i) wireless communications with a RAN in accordance with an agreed communication protocol, such as one of the protocols noted herein for instance (e.g., a CDMA protocol), and (ii) wireless communications under a second wireless protocol, which is the short-range wireless protocol used by access-provisioning nodes to provide transmit-power messages. In particular, access-provisioning system 200 includes a CDMA communication interface 202 that, for example, facilitates air interface communications with a RAN under IS-2000 and/or under IS-856, and a short-range wireless communication interface 204 that facilitates communications with access-provisioning nodes, and possibly with one or more of various other types of devices as well.

Each communication interface 202, 204 may comprise hardware, firmware, and/or software, configured to provide the functionality described herein. Further, while communication interfaces 202, 204 are illustrated as separate components of access-provisioning system 200, these interfaces may alternatively be implemented in a common component (e.g., a chipset including both communication interfaces). Yet further, while FIG. 2 illustrates access-provisioning system 200 as embodied in a singular component, the access-provisioning system 200 may also comprise multiple components, which together provide the functionality described herein According to an exemplary embodiment, access-provisioning system 200 also includes program instructions 206, which are stored in data storage 208 (e.g., one or more volatile and/or non-volatile storage components of the mobile station, such as magnetic, optical, or organic storage components), and which are executable by one or more processors 210 (e.g., general purpose and/or special purpose processors) in order to carry out the various functions of an access-provisioning node described herein (and possibly other functions as well). The processor 210 and data storage 208 may be any suitable component or components (e.g., hardware, firmware, and/or software) that can be configured to provide the functionality described herein.

In an exemplary embodiment, program instructions 206 may be executable to cause the access-provisioning system 200 to: (i) determine a verified transmit power for reverse-link communications from the system-information node to a base station in the radio access network, wherein the reverse link communications are carried out under a first wireless protocol; and (ii) transmit a transmit-power message under the second wireless protocol, wherein the transmit-power message comprises an indication of the verified transmit power for use by a mobile station to set an initial transmit power of the mobile station.

Referring back to FIG. 1, in order to take advantage of the system information provided by access-provisioning node 120, mobile station 112 is preferably configured to receive transmissions under the second, short-range wireless protocol, in addition to being configured for communications with RAN 102 under one or more of the above-discussed wireless communication protocols. As such mobile station 112 may also include at least two wireless communications interfaces: (i) a first interface for communicating with the RAN 102, and (ii) a second interface for receiving transmit-power messages that have been broadcast using the short-range wireless protocol.

To implement the functionality described herein, mobile station 112 may include program instructions that are stored in data storage and executable by one or more processors in order to carry out the various functions of a mobile station herein (and possibly other functions as well). The processor 210 and data storage 208 may be any suitable component or components (e.g., hardware, firmware, and/or software) that can be configured to provide the functionality described herein.

In an exemplary embodiment, mobile station 112 is configured to use the indication of verified provided in the transmit power-message from access-provisioning node to set its own initial transmit power. However, because there may be many locations where no transmit-power message is available (as there is no access-provisioning node located nearby), or because the mobile station may fail to find a transmit-power message for some other reason, mobile station 112 is preferably configured to search for transmit power message from an access-provisioning node, but to resort to another technique to determine initial transmit power, such a typical IS-2000 technique based on forward-link parameters, in the event that it does not find a transmit-power message.

Figure 3:
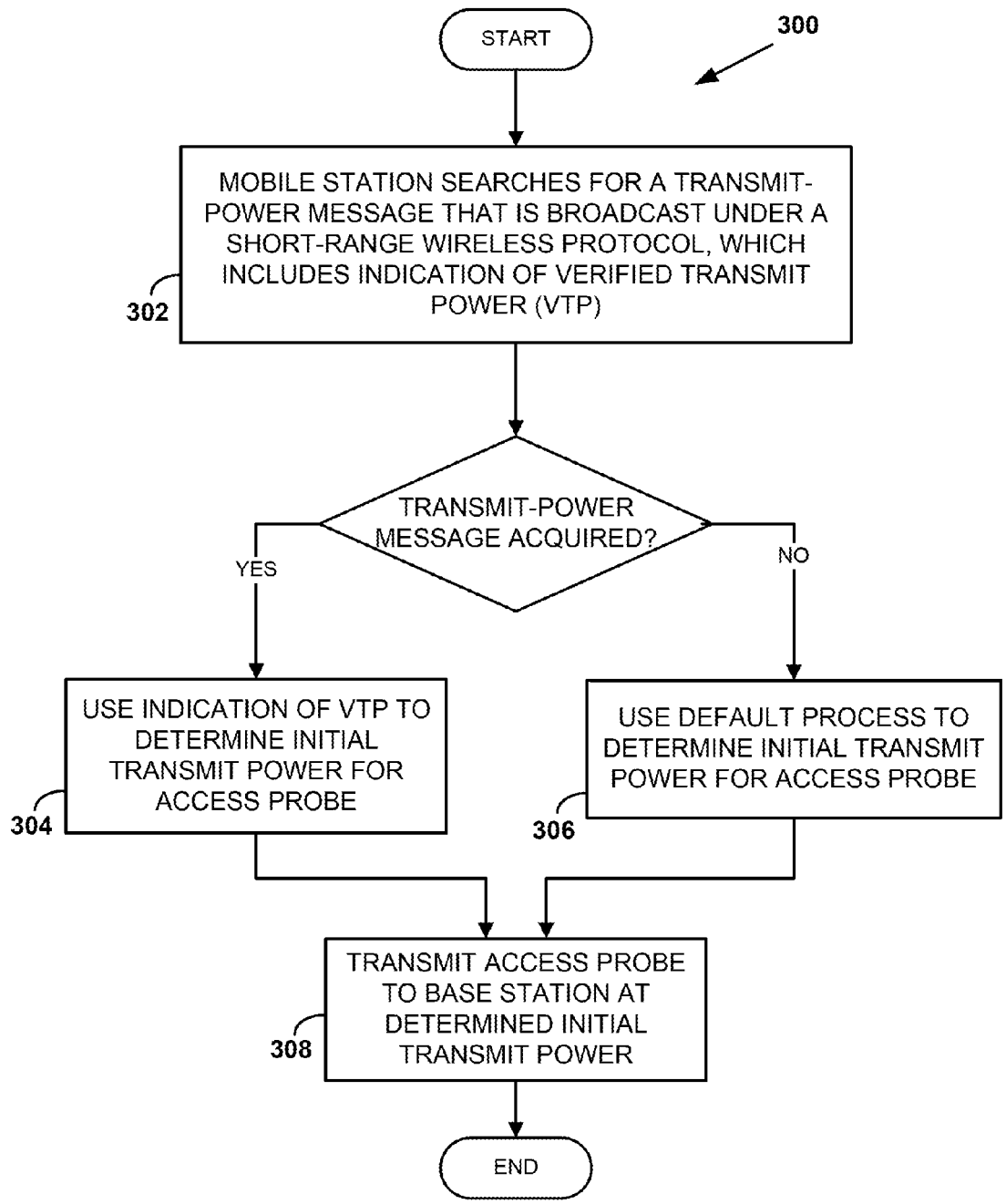
FIG. 3 is a flow chart illustrating a method according to an exemplary embodiment.

FIG. 3 is a flow chart illustrating a method 300 according to an exemplary embodiment, which is preferably carried out by a mobile station. Preferably, the mobile station carrying out method 300 is configured to engage in wireless communications with a RAN under a first wireless protocol (e.g., IS-2000, IS-856, etc.), and to receive transmit-power messages from an access-provisioning node under a second wireless protocol, which is preferably a short-range wireless protocol (e.g., 802.11 or Bluetooth).

In particular, method 300 involves the mobile station searching for a transmit-power message that is broadcast under a short-range wireless protocol, as shown by block 302. The transmit-power message, which is typically broadcast from an access-provisioning node, includes an indication of a verified transmit power for reverse-link communications with a given base station under a first wireless protocol, as determined by the access-provisioning node. If the mobile station finds and acquires a transmit-power message from an access-provisioning node, then the mobile station uses the indication of the verified reverse-link transmit power as a basis for determining the mobile station's own initial transmit power, as shown by block 304. If, on the other hand, the mobile station is unable to find a transmit-power message from a nearby access-provisioning node, then the mobile station uses a default process to determine the initial transmit power, as shown by block 306. The mobile station then transmits the access probe to the base station at the determined initial transmit power, as shown by block 308.

Since the verified transmit power indicated in the transmit-power message is (a) determined by an access-provisioning node that is nearby (a condition that follows from the fact it is broadcast using a short-range wireless protocol), and (b) is preferably updated by the access-provisioning node to reflect recent air-interface conditions, the mobile station may assume that the verified transmit power is close to the verified transmit power that will ultimately be determined when the mobile station engages in open-loop power control. Accordingly, the step of using the indication of the verified transmit power to determine the initial transmit power may simply involve the mobile station setting its initial transmit power equal to the verified transmit power of the access-provisioning node. Alternatively, the mobile station may use the verified transmit power as an input to the calculation of its initial transmit power.

According to method 300, when a transmit-power message is not available to the mobile station, the mobile station uses an alternative process to determine the initial transmit power. For example, it may use a process that is typical for IS-2000 devices, in which forward-link parameters are used to determine the initial transmit power. As another alternative, the mobile station may simply set the initial transmit power equal to a predetermined power level. Other default processes are also possible.

In a further aspect, method 300 may be preformed on an as-needed basis. For example, a mobile station may initiate method 300 whenever it powers on and/or whenever it is about to send an access probe. In particular, whenever a mobile station powers on and/or is about to send an initial access probe, it may search for a transmit power message, and if found, set its initial transmit power equal to the verified transmit power indicated in the transmit power message. Additionally or alternatively, a mobile station may initiate method 300 or portions thereof on a regular basis, in order to maintain an up-to-date initial transmit power. For example, a mobile station may periodically search for transmit-power messages and store an indication of the verified transmit power indicated by the most-recently received transmit-power message. As such, the mobile station may have the most-recent readily available to determine its initial transmit power whenever the mobile station needs to send an access probe.

In some embodiments, a mobile station may determine its initial transmit by applying a correction factor to the verified transmit power indicated by the access-provisioning node. For example, the mobile station may determine when the signal strength from the access-provisioning node is below a certain threshold (e.g., 11 decibels), and responsively apply a correction factor to the verified transmit power indicated by the access-provisioning node. As another example, the mobile station may determine received signal strength of a pilot signal from a base station, and received signal strength from the access-provisioning node. By comparing the relative signal strengths, the mobile station may determine whether it is further from or closer to the base station, and accordingly apply a correction factor to the verified transmit power indicated by the access-provisioning node. In both cases, the value of this correction factor may be determined as a matter of engineering design choice.

In a further aspect of an exemplary method, a mobile station may be configured to receive transmit-power messages from two or more access-provisioning nodes, and to select one of the received transmit power messages to rely on. To do so, the mobile station may determine the signal strength of each received transmit power message. The mobile station may then use the indicated verified transmit power provided by the access-provisioning node associated having the greatest signal strength. Other techniques may also be used when multiple transmit power messages are available at a given location, without departing from the scope of the invention.

Figure 4:
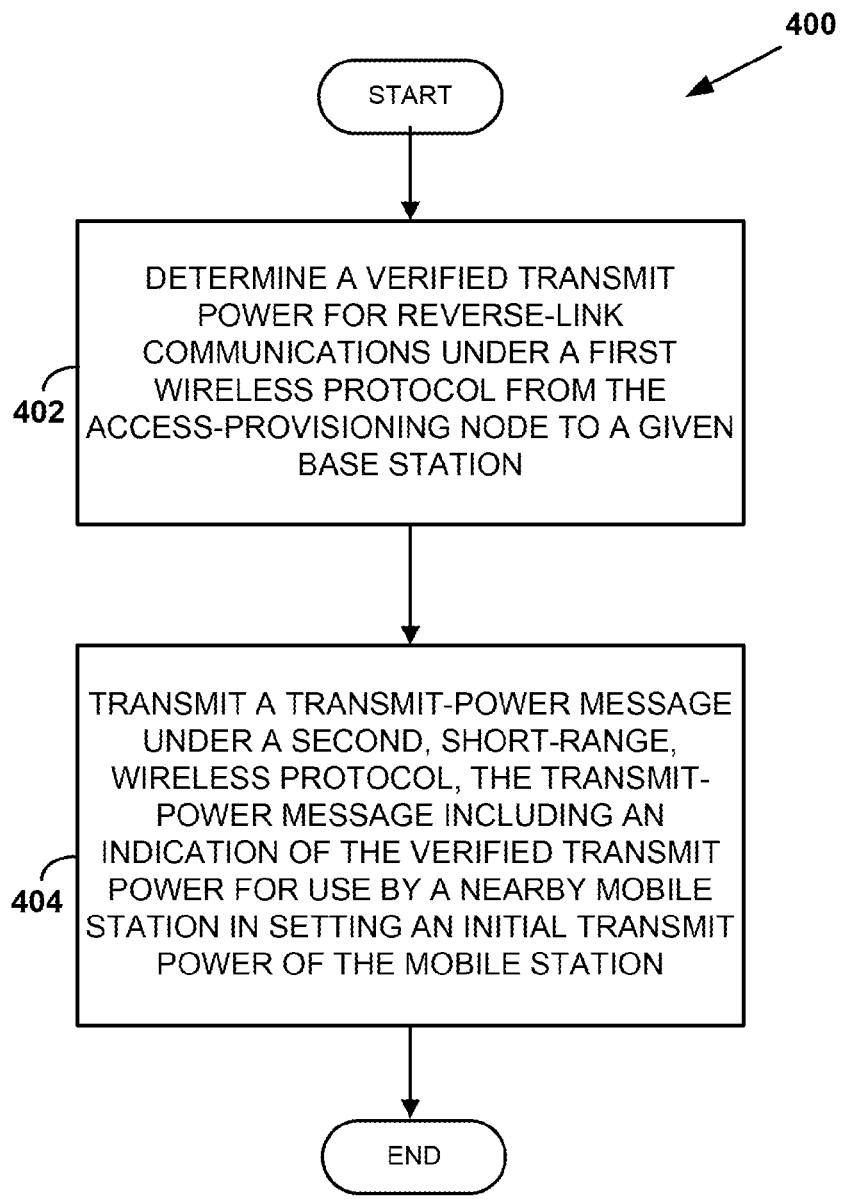
FIG. 4 is another flow chart illustrating a method according to an exemplary embodiment.

FIG. 4 is another flow chart illustrating a method 400 according to an exemplary embodiment, which is preferably carried out by an access-provisioning node. Preferably, the access-provisioning node carrying out method 400 is configured to engage in wireless communications with a RAN under a first wireless protocol (e.g., IS-2000, IS-856, etc.), and to broadcast transmit-power messages under a second wireless protocol, which is preferably a short-range wireless protocol (e.g., 802.11 or Bluetooth).

Method 400 involves an access-provisioning node determining a verified transmit power for reverse-link communications under a first wireless protocol, as shown by block 402. This first protocol is preferably a protocol under which a licensed frequency band is used by a service provider to provide wireless voice and/or data service (e.g., IS-2000, IS-856, etc.). The verified transmit power is determined for reverse-link communications sent from the access-provisioning node to a given base station in a radio access network, which is preferably, although not necessarily, the base station from which the access-provisioning node receives the strongest pilot signal (e.g., the pilot signal having the highest measured Ec/Io) and/or the base station that is geographically the closest to the access-provisioning node.

Method 400 further involves the access-provisioning node transmitting a transmit-power message under a second wireless protocol, which is preferably a short-range wireless protocol making use of an licensed frequency band, as shown by block 404. As further indicated by block 404, the transmit-power message includes an indication of the verified transmit power for use by a nearby mobile station in setting an initial transmit power of the mobile station. Other information, which may or may not assist a mobile station in connecting to the RAN, may also be included in the transmit power message.

In an exemplary embodiment, an access-provisioning node may use the standard techniques, such as those employed heretofore by mobile stations operating under IS-2000, in order to determine its verified transmit power. For example, an access-provisioning node may initially use open loop power control to determine its verified transmit power for reverse-link communications with a given base station. It is contemplated, however, that an access-provisioning node any technique to determine its verified transmit power.

Furthermore, an access-provisioning node may be configured to periodically or continually update its verified transmit power. For example, an access-provisioning node may be configured to use open loop power control to initially determine its verified transmit power, and to subsequently implement closed loop power control processes in order to keep the value of its verified transmit power up-to-date. Alternatively, an access-provisioning node may be configured to periodically update its verified transmit power by repeating open loop power control processes. For instance, the access-provisioning node may periodically re-determine its initial transmit power, and repeat standard open loop power control processes in order to re-determine its initial transmit power. It is also possible that an access-provisioning node may utilize other techniques to periodically or continually update its verified transmit power.

In order to provide nearby mobile stations with an up-to-date indication of its verified transmit power, an exemplary method may further involve an access-provisioning node periodically or continually transmitting a transmit-power message. For example, the access-provisioning node may broadcast a transmit-power message whenever it updates its verified transmit power. Generally, however, the period with which an access-provisioning node updates its verified transmit power and/or broadcasts a transmit-power message may vary as a matter of engineering design choice.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

I claim:

1. A method comprising:
   (a) at an access-provisioning node installed in a coverage area of a radio access network, determining a verified transmit power for reverse-link communications from the access-provisioning node to a base station in the radio access network, wherein the reverse link communications are carried out under a first wireless protocol; and
   (b) the access-provisioning node transmitting a transmit-power message under a second wireless protocol, wherein the second wireless protocol is a short-range wireless protocol, and wherein the transmit-power message comprises an indication of the verified transmit power for use by a mobile station to set an initial transmit power of the mobile station.

2. The method of claim 1, wherein determining the verified transmit power for reverse-link communications comprises using open loop power control to determine the verified transmit power for reverse-link communications.

3. The method of claim 1, further comprising periodically repeating the step of transmitting a transmit-power message under a second wireless protocol.

4. The method of claim 1, wherein transmitting the transmit-power message under the second wireless protocol comprises continually transmitting the transmit-power message under the second wireless protocol.

5. The method of claim 1, further comprising:
   periodically repeating steps (a) and (b);
   wherein, during a first iteration of steps (a) and (b), determining the verified transmit power for reverse-link communications comprises using open loop power control to determine the verified transmit power for reverse-link communications; and
   wherein, during one or more subsequent iterations of steps (a) and (b), determining the verified transmit power for reverse-link communications comprises using closed loop power control to determine the verified transmit power for reverse-link communications.

6. The method of claim 1, wherein the second wireless protocol comprises a wireless protocol implemented on an unlicensed frequency band.

7. The method of claim 6, wherein the second wireless protocol comprises either a Bluetooth protocol or an 802.11 protocol.

8. The method of claim 1, wherein the transmit-power message further comprises an identifier of the base station.

9. The method of claim 1, wherein the access-provisioning node is installed at a location where a likelihood exists that many subscribers will attempt to connect to the radio access network at substantially the same time.

10. The method of claim 9, wherein the location is at an airport terminal.

11. A method comprising:
before a mobile station transmits an access probe, the mobile station performing a search for a transmit-power message that is broadcast from an access-provisioning node under a second wireless protocol, wherein the second wireless protocol is a short-range wireless protocol, and wherein the transmit-power message comprises an indication of a verified transmit power for reverse-link communications under a first wireless protocol, wherein the verified transmit power has been determined by the access-provisioning node for reverse-link communications from the access-provisioning to a base station in the radio access network;
if the transmit-power message is acquired in the search, then the mobile station using the indication of the verified reverse-link transmit power as a basis for determining an initial transmit power for the access probe;
if the transmit-power message is not acquired in the search, then the mobile station using a default process to determine the initial transmit power for the access probe; and
transmitting the access probe to the base station at the determined initial transmit power.

12. The method of claim 11, wherein the second wireless protocol comprises a wireless protocol implemented on an unlicensed frequency band.

13. The method of claim 12, wherein the second wireless protocol comprises either a Bluetooth protocol or an 802.11 protocol.

14. The method of claim 12, wherein the mobile station performs the search using the second wireless protocol.

15. The method of claim 11, wherein using the indication of the verified reverse-link transmit power as a basis for determining the initial transmit power comprises setting the initial transmit power equal to the verified reverse-link transmit power.

16. The method of claim 11, wherein using the indication of the verified reverse-link transmit power as a basis for determining the initial transmit power for the access probe comprises:
determining a signal strength of the transmit-power message;
using the determined signal strength as a basis for determining a correction factor; and
using the determined correction factor as a further basis for determining the initial transmit power for the access probe.

17. The method of claim 11, wherein using a default process for determining the initial transmit power comprises setting the initial transmit power equal to a predetermined power level.

18. The method of claim 11, further comprising:
the mobile station acquiring a plurality of transmit power messages in the search;
the mobile station determining a signal strength of each acquired transmit-power message; and
the mobile station using the indication of the verified reverse-link transmit power from the transmit-power message having the greatest signal strength as a basis for determining the initial transmit power for the access probe.

19. An access-provisioning system comprising:
a first communication interface configured for wireless communications with a base station in a radio access network, wherein communications with the base station are carried out under a first wireless protocol;
a second communication interface configured for wireless communications with a mobile station, wherein communications with the base station are carried out under a second wireless protocol, wherein the second wireless protocol is a short-range wireless protocol; and
program instructions stored in a non-transitory computer readable medium and executable by at least one processor to cause the access-provisioning system to:
determine a verified transmit power for reverse-link communications from the access-provisioning node to a base station in the radio access network, wherein the reverse link communications are carried out under a first wireless protocol; and
transmit a transmit-power message under the second wireless protocol, wherein the transmit-power message comprises an indication of the verified transmit power for use by a mobile station to set an initial transmit power of the mobile station.

20. The access-provisioning system of claim 19, wherein the second wireless protocol comprises either a Bluetooth protocol or an 802.11 protocol.

21. A mobile-station system comprising:
a first communication interface configured for wireless communications under a first wireless protocol;
a second communication interface configured for wireless communications under a second wireless protocol, wherein the second wireless protocol is a short-range wireless protocol; and
program instructions stored in a non-transitory computer readable medium and executable by at least one processor to:
before transmission of an access probe by a mobile station, search for a transmit-power message that is transmitted from an access-provisioning node under the second wireless protocol, wherein the transmit-power message comprises an indication of a verified transmit power for reverse-link communications under a first wireless protocol, wherein the verified transmit power has been determined by the access-provisioning node for reverse-link communications from the access-provisioning node to a base station in the radio access network;
if the transmit-power message is acquired in the search, then use the indication of the verified reverse-link transmit power as a basis to determine an initial transmit power for the access probe;
if the transmit-power message is not acquired in the search, then use a default procedure to determine the initial transmit power for the access probe; and
transmit the access probe to the base station at the determined initial transmit power.

22. The mobile-station system of claim 21, wherein the second wireless protocol comprises either a Bluetooth protocol or an 802.11 protocol.

* * * * *